United States Patent

[11] 3,628,572

| [72] | Inventor | Richard F. Shannon |
| | | Lancaster, Ohio |
| [21] | Appl. No. | 888,241 |
| [22] | Filed | Dec. 29, 1969 |
| [45] | Patented | Dec. 21, 1971 |
| [73] | Assignee | Owens-Corning Fiberglas Corporation |

[54] PIPE INSULATION AND METHOD OF INSTALLING SAME
3 Claims, 10 Drawing Figs.

[52] U.S. Cl. .................................... 138/161,
138/166, 138/149, 138/156
[51] Int. Cl. .................................... F16l 9/22
[50] Field of Search .......................... 138/161,
156, 162, 163, 165, 166, 149

[56] References Cited
UNITED STATES PATENTS

| 2,374,815 | 5/1945 | Haas | 138/161 |
| 2,385,202 | 9/1945 | Haas | 138/161 |
| 3,014,827 | 12/1961 | Clinchy | 138/161 |
| 3,095,337 | 6/1963 | Chase | 132/162 X |
| 3,489,183 | 1/1970 | Eberle | 138/156 |

*Primary Examiner*—Herbert F. Ross
*Attorneys*—Staelin and Overman and William P. Hickey ABSTRACT: Pipe insulation comprising two abutting blocks of insulation each having a half annular cross section whose central cavity receives the pipe. The leg of each block on opposite sides of the pipe are stepped, and the blocks are held together by C-clips which are positioned in circumferentially extending grooves so that the clips lie beneath the surface of the insulation. The steps of the abutting legs of the blocks preferably have an interference fit which, in some instances, may be slightly Z-shaped so that the blocks are locked together by the spring action of the clips to prevent radiation and convection losses. The end surfaces of the insulation blocks are likewise stepped for dovetailing with endwise located blocks, and preferably have an interference fit therewith to prevent radiation and convection losses by separation therebetween.

PATENTED DEC 21 1971

3,628,572

INVENTOR.
RICHARD F. SHANNON
BY
Staelin & Overman
ATTORNEYS

RICHARD F. SHANNON
INVENTOR

BY

Staelin & Overman
ATTORNEYS 3,628,572

PIPE INSULATION AND METHOD OF INSTALLING SAME

BACKGROUND OF THE INVENTION

The shape and manner of installation of pipe insulation has not changed significantly since the steam boiler was developed. Pipe insulation conventionally comprises two hemicylindrical-shaped blocks of lightweight materials whose flat surfaces are abutted, and each of which have a hemicylindrically shaped cavity in their abutting surfaces for receiving the pipe to be insulated. Each block, therefore, has a half-annular cross section, and these blocks are held in place around the pipe by means of bands which are either wires the ends of which are twisted together, or thin sheet metal bands the ends of which are crimped together. It is difficult for one man to hold the two half sections of insulation around a pipe and at the same time twist or crimp the ends of the bands together, so that installation crews usually consists of at least two men.

Pipe insulation is installed on pipe while the pipe is at room temperature, and thereafter hot or cold fluids are introduced to the pipe which causes the pipe to expand or contract. This expansion causes the pipe to change its length appreciably, and where hot fluids are introduced to the pipe, the pipe grows, and openings develop between the blocks of insulation. Longitudinally extending openings between blocks of insulation material also occur when the insulation bands are not drawn tightly by the insulation crews, or when the abutting surfaces of the block contain irregularities. One particularly troublesome type of end separation is caused when two half sections of insulation are installed with the sections shifted endwise of each other.

Insulation materials are expensive, and installation of the materials involves a considerable amount of handwork. Numerous suggestions have been made in the past for cutting down the amount of handwork, as by using springs, for example, to hold the two half sections together; but springs have not proved workable since the blocks must be spread wide apart to be installed over the pipe; and if the springs are made strong enough to hold the half sections together, they crush the insulation when spread apart to receive the pipe. The spring rate of the springs which are used, is limited by the soft crushing nature of the insulation, and when springs are depended upon to hold the two half sections together, sagging usually occurs allowing separation between the half sections of insulation. A considerable amount of handwork is also involved in the manufacture of the insulation, so that any changes in construction intended to reduce the labor required for installation must be balanced against the increased cost of manufacture, or preparation for installation.

An object of the present invention is the provision of a new and improved pipe insulation, the total cost of the preparation and installation of which is less than that of the prior art.

Another object of the present invention is the provision of a new and improved pipe insulation comprising two half sections which can be moved apart to a degree without developing line-of-sight radiation losses, or convection losses.

A further object of the present invention is the provision of new and improved insulation materials of the above described type which are spring biased toward each other, and which utilize friction means for holding the blocks in a closed position.

A further object of the invention is the provision of new and improved insulation of the above described type which also utilizes the spring means for keying the half sections together to prevent relative endwise movement.

A still further object of the present invention is the provision of new and improved insulation of the above described type wherein the spring means supplies locking friction for holding the two half sections in closed position.

Further objects and advantages of the invention will become apparent from those skilled in the art to which the invention relates from the following description of the preferred embodiments described with reference to the accompanying drawings forming a part of this specification.

DESCRIPTION OF THE PREFERRED EMBODIMENTS

Figure 1:
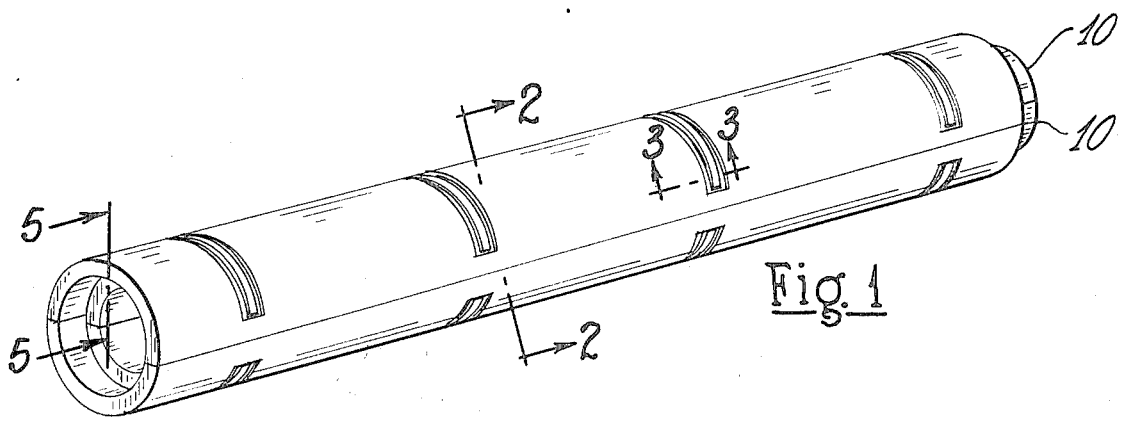
FIG. 1 is an isometric view of two half sections of insulation material shown locked together as occurs when installed upon pipe.
Figure 2:
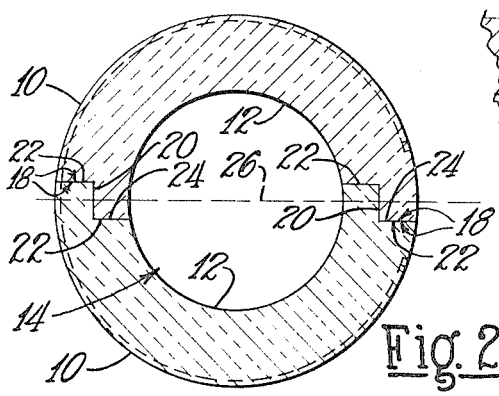
FIG. 2 is a cross-sectional view taken approximately on the line 2—2 of FIG. 1.
Figure 3:
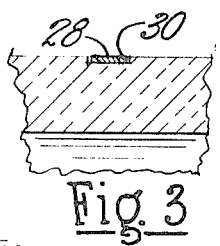
FIG. 3 is a fragmentary sectional view taken approximately on the line 3—3 of FIG. 1.
Figure 4:
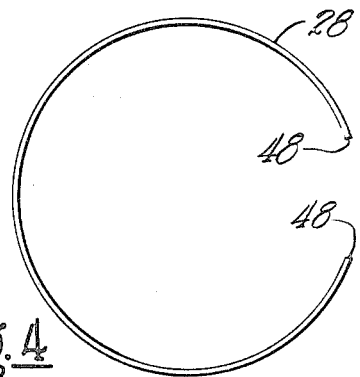
FIG. 4 is a side view of one of the spring clips shown in FIGS. 1, 2 and 3.

The embodiment of pipe insulation shown in FIG. 1 generally comprises a pair of abutting hemicylindrically shaped blocks having a hemicylindrically shaped cavity in their abutting surfaces to form a cylindrical chamber 14 for receiving a pipe, not shown. In the embodiment shown, the two hemicylindrically shaped blocks 10 are identically shaped so that they can be produced from a single mold. The leg portions of each block that are on opposite sides of the cavity 12, and which abut each other have irregularly shaped abutment surfaces 18 which are preferably stepped to include a portion 20 that extends at generally right angles to the remainder of the abutment surface 18. In the embodiment shown, one portion 22 of the abutting surface 18 projects outwardly beyond the major diameter of the cavity 12 and the other portion 24 lies at or beneath the major diameter of the cavity 12. Preferably, however, the portions 22 and 24 are equidistant from the plane of the major diameter of the cavity 12 as indicated by the dashed line 26, with the portion containing the surface 22 being wider than the portion containing the surface 24, for reasons which will later be apparent.

Figure 5:
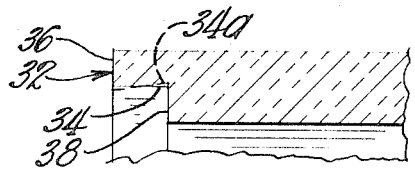
FIG. 5 is a fragmentary sectional view of one end of the insulation taken approximately on the line 5—5 of FIG. 1.
Figure 6:
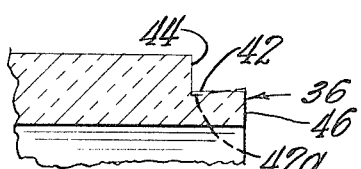
FIG. 6 is a fragmentary sectional view of the other end of the insulation.

The two blocks 10 of insulation material are held in assembled relationship by a plurality of C-shaped springs 28 which are preferably flat bands, and which are seated in circumferentially extending grooves 30. In the embodiment shown, the circumferential grooves 30 have a width substantially no wider than the spring clips 28, so that they lock the two sections together against endwise movement. Sections of pipe insulation are, of course, arranged in an end-to-end arrangement along the length of the pipe. In order to avoid line-of-sight radiation and convection losses between the lengths of insulation, the embodiment shown in FIGS. 1-5 utilizes the same general Z-type abutting surface on the ends of the insulation as is used along the length of the insulation. The construction of one end of the insulation is shown in FIG. 5, and the construction of the other end of the insulation is shown in FIG. 6. The end surface 32 shown in FIG. 5 has a cylindrical portion 34 with the section 36 outwardly therefrom being wider than the section 38 inwardly therefrom. The end surface 36 shown in FIG. 6 likewise has a cylindrical portion 42, but in this case the section 44 outwardly therefrom is wider than the section 46 inwardly therefrom. It will be seen that the end shown in FIG. 5 on one section will be slid over the end shown in FIG. 6 of the preceding section. When this is done, a slight interference fit is provided between the cylindrical surface 34 of one section and the cylindrical surface 42 of the other section. Since the half sections 10 of insulation are biased together by springs and are held closed by a frictional fit, the surface 34 will remain against the surface 42 even though the surfaces 18 become slightly separated. A seal is, therefore, provided between adjacent lengths of insulation to prevent convection and radiation losses even though the legs are not in full abutting contact.

The spring clips 28 are installed so that their ends 48 straddle the surfaces 18 along one side of a pair of matching blocks 10. The insulation is installed upon pipe by spreading the blocks 10 along the surface straddled by the ends 48 of the C-clips 28, and moving the separated surfaces 18 over the pipe. The separating force on the blocks is then removed and the springs 28 are allowed to spring the surfaces 18 together again. As previously explained, a slight interference fit is provided between the surfaces 18, so that it is necessary to slide the top block 10 laterally relative to the bottom block 10 to allow the end portion 24 of the top block to clear the end portion 24 of the bottom block. The installer then forces the two sections positively together and when he releases pressure thereon, the springs 28 bias the top block backwardly and the bottom block forwardly to positively hold the normal surface 20 of the top block. Thereafter, friction between these surfaces is sufficient to hold the blocks together, even though the squeezing action of the springs 28 would not be sufficient to prevent gravity from separating the surface 18 of the bottom block from the surface 18 of the top block. In some instances, the cavity 14 may be provided with an interference relative to the pipe which is greater than the interference fit provided between the surfaces 20 of the top and bottom blocks, so that the portion 24 on each block 10 can be wedged up in between the pipe and the other block 10. This interference with the pipe can additionally be depended upon to prevent separation of the blocks.

Figure 7:
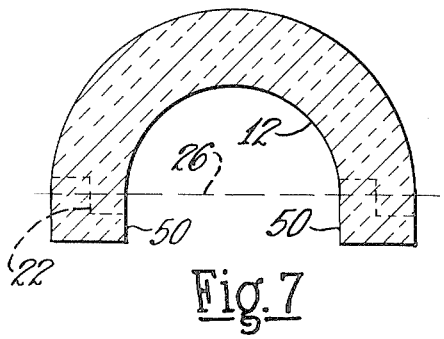
FIG. 7 is a sectional view of a preform that is used to produce one of the two identical half sections shown in FIG. 1.

The configuration so far described would have no practical value if the increased labor required to provide the configuration was more than the amount of labor that is saved in the installation of the configuration. The configuration shown is produced by providing an extended leg portion on the molds used to form the block, so that the molded blocks will include the extended legs 50 shown in FIG. 7, and which extend beyond the major diameter of the cavity 12. The extending legs 50 are thereafter accurately trimmed to size by a pair of appropriately shaped and spaced routers which are appropriately positioned relative to a carriage that supports the block 10 as it moves therepast. The configuration, therefore, is provided by what is nothing more than a trimming operation which at the same time accurately sizes the block.

After the surfaces 18 are provided on the opposite legs of the block, two of the blocks are matched together. The circumferential recesses 30 may be formed by clamping two blocks together and rotating the blocks against accurately spaced apart routers. Thereafter the spring clips 28 are installed in the thus formed recesses 30 to key the two blocks 10 together and prevent endwise movement. Thereafter, the two assembled blocks have their ends cut to length, and are routed to provide the opposite end configurations 32 and 36. The routing operation may be performed by gauging from the surfaces of the chamber 14 to assure proper fit.

Figure 8:
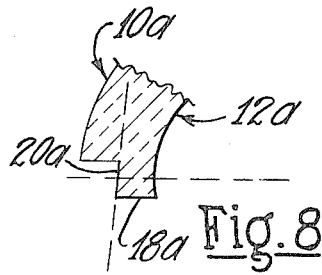
FIG. 8 is a fragmentary sectional view of another embodiment of the invention.

FIG. 8 of the drawings and the dashed lines in FIGS. 5 and 6 shown portions of another embodiment of the invention which is generally similar to that previously described, but differs principally therefrom in the shape of the surfaces 18, 32 and 36. Those portions of the embodiment shown in FIGS. 5, 6 and 8 which are similar to the embodiment previously described are designated by a like reference numeral characterized further in that a suffix "a" is affixed thereto. As shown in FIG. 8, the stepped portion 20a is inclined inwardly to provide a keying action which more positively locks the two sections together. Additionally, the cylindrical surfaces 34a and 42a may also be undercut to provide a keying action restraining separating movement between end wise positioned blocks of insulation material.

It will be seen that a new and improved configuration of insulation materials has been provided which substantially eliminates radiation and convection losses between abutting blocks of insulation, even though a slight opening movement occurs. This makes it possible to utilize spring clips which the prior art has found unreliable in holding blocks together, and since the spring clips are recessed, they also prevent endwise movement to facilitate the routing and forming of the blocks. It will further be seen that a further improvement is provided by providing an interference fir of the step of the abutting surfaces to key or lock the halves together, and that the same spring clips additionally provide a lateral force which holds the two halves locked together. This locking action may also be used to prevent endwise separation of adjacent lengths of insulation.

The blocks 10 having the grooves 30 therein can be made of any suitable material having the necessary insulation properties and sufficient mechanical strength, so that the lengths of insulation will support their own weight during handling. For temperatures below approximately 300° F., rigid organic foams having a density of from ½ to 12 pounds per cubic foot can be used. Such foams will include polyethylene foam, polystyrene foam, polyurethane foam, phenolic foam, vinyl chloride foam, and polyester foam. In general, the organic foams will withstand water. For higher temperature applications, however, inorganic materials are necessary; and for many of these applications, inorganic foams having a density of from 3 to 20 pounds per cubic foot will be most suited. Such foams will include glass foams, sodium silicate foam, foamed cements such as foamed Portland cement, foamed gypsum, the foamed oxysulfate cements, as for example magnesium oxysulfate, and the silica foams. Fibers bonded together either by an organic resin, or an inorganic binder, and having a density of from 2 to 15 pounds per cubic foot, can also be used for the above described temperature ranges depending upon whether an organic resin or an inorganic cement is used to bond the fibers together. Such composites will include resin bonded glass fibers, resin bonded mineral wool, resin bonded rock wool, resin bonded asbestos fibers, resin bonded aluminum silicate or ceramic fibers; and inorganic bonded asbestos, as for example asbestos fibers bonded together with sodium silicate, or a clay. For temperatures above approximately 500° F., rigid inorganic composites having a density of between 5 and 25 pounds per cubic foot are most suited. These composites will include hydrous calcium silicate materials that are either pan poured, filter pressed, or extruded into the desired shape from suitable aqueous slurries, following which the water is evaporated. Other inorganic composites capable of exposure to high temperatures will include the inorganic bonded porous aggregates, such as pearlite, vermiculite, hollow glass or clay pellets, and fly ash bonded together by silicates, sodium silicates, clay, or other inorganic binders. The insulation material for use on refrigeration equipment should be such that it is not decomposed by the condensation which takes place, and further preferably forms a vapor barrier. For such applications, cemented particles of cork are widely used.

EXAMPLE 1

The insulation material shown in the drawings is made of hydrous calcium silicate bonded inorganic fibers and has a density of approximately 11.0 pounds per cubic foot. This material, because of its brittle nature, is most advantageously held assembled by the spring-shaped clips, and is a preferred assembly of the present invention.

A slurry having a water to solids ratio of 6:1 was prepared from the following materials:

| Materials | Parts by Weight |
| --- | --- |
| Asbestos | 500 |
| Quicklime (94% CaO available) | 880 |
| Diatomaceous Earth | 1,100 |
| Kaolin | 100 |
| Crushed stone fillers 325 mesh | 160 |
| Product fines | 475 |
| Liquid sodium silicate (3.25 to 1 (40% solids) | 250 |

The slurry is prepared by blending the kaolin, crushed stone and four-fifths of the asbestos into a tank containing one-half of the water, and mixing these materials. The remainder of the asbestos and fines are added to a second tank containing one-half of the water at room temperature, and these materials are thoroughly mixed. Thereafter the contents of both tanks are mixed together, and the lime is added and hydrated for from 3 to 5 minutes. The diatomaceous earth is then added and mixed for 3 minutes. Thereafter the sodium silicate is added and mixed only long enough to achieve a uniform blend.

Figure 9:
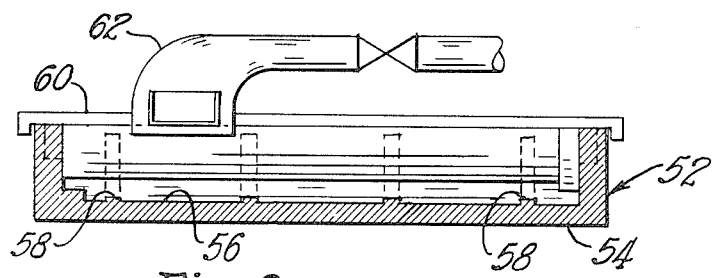
FIG. 9 is a schematic view of a pan-forming operation used in producing the insulation.

In the present instance the insulation is made by a molding or casting process. The recesses 30 are preferably made by providing raised surfaces in the mold, which raised surfaces correspond to the shape of the recesses desired. This technique has particular advantages in the pan-pouring process of making the hydrous calcium silicate composites. In FIG. 9 of the drawings, there is shown a two-piece mold 52 for making the insulation blocks. The bottom section 54 of the mold has a hemicylindrical-shaped cavity 56 whose shape corresponds to the outside surface of the insulation blocks 10. A pair of metal strips 58 are secured to the inner surface of the bottom mold section 54 at the locations where the recesses 30 are desired. The strips 58 have a cross section whose width is just slightly greater than that of the C-shaped clips 28, and a height that is also slightly greater than the thickness of the clips 28. In the embodiment shown in FIG. 9, the upper surface of the strips 58 are flat to correspond to the surface of the strip from which the clips 28 are made. The mold 52 also includes a top portion 60 having a hemicylindrically shaped bottom projection, which fits into the cavity 56, and which is spaced from its sidewalls by the thickness of the insulation to be made. FIG. 9 also shows a filling nozzle 62 in position between the mold sections 54 and 60 for filling the annulus therebetween with the slurry of the hydrous calcium silicate forming materials.

The slurry-filled molds thus prepared are placed in a live steam chamber heated to 190° F. for 1 to 3 hours. Thereafter, the slurry-filled molds are indurated in a steam autoclave which is brought up to a pressure of approximately 250 pounds per square inch and a temperature of approximately 280° C. over a period of 1 hour. The temperature and pressure are held for a sufficient length of time to form tobormorite, usually approximately 4 hours, after which the pressure is slowly reduced. The total pressurizing, induration and depressurizing cycle will usually take approximately 6 hours.

Hydrous calcium silicate bonded fillers, which usually include an inorganic fiber, can also be produced by a filter press process.

Figure 10:
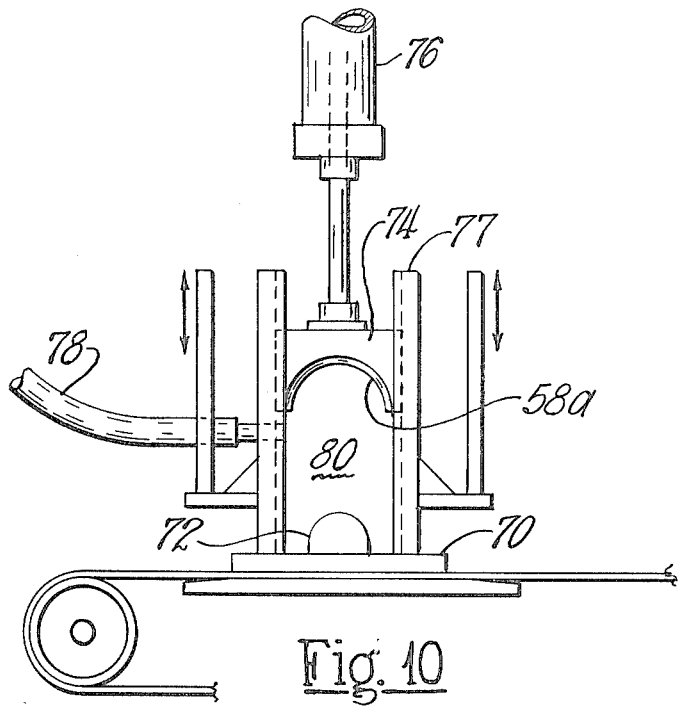
FIG. 10 is a schematic view of a filter press operation used in producing the insulation.

FIG. 10 of the drawings shows a filter press having a perforated filter mold base plate 70 having a porous hemicylindrical surface of the insulation blocks to be made. The press also includes a porous piston 74 having a concave surface which corresponds with the outside cylindrical surface of the insulation blocks to be made, and which piston 74 is raised and lowered onto the base plate 70 surrounding the cylindrical surface 72 by a double-acting piston and cylinder arrangement 76. The piston 74 is in sliding engagement with, and is surrounded by, a nonporous cylinder 77 which also can be raised and lowered by suitable means into a position over the base plate 70. The cylinder 74 is provided with a flexible inlet connection 78 for introducing a partially gelled hydrous calcium silicate forming slurry similar to that given above between the piston 74 and the base plate 70, when the piston 74 is in an upper position. After the cavity 80 between the piston 74 and base plate 70 is filled with the gel, the piston 74 is forced downwardly by the double-acting cylinder 76 to squeeze the excess water therefrom through the pores of the piston 74 and base plate 70 to leave the solids of the slurry with a predetermined amount of water in the configuration of the insulation blocks desired. The bottom surface of the piston 74 is provided with strips 58a which correspond to the strips 58 of the embodiment shown in FIG. 9 at locations to provide the recesses 30 in the insulation that is made.

EXAMPLE 2

Insulation material suitable for insulating surfaces having temperatures of approximately 1,000° F. can also be prepared from various inorganic light weight aggregates bonded together by various inorganic binders. Insulation material is produced from the following materials:

| Materials | Percent by Weight of Solids |
|---|---|
| Expanded pearlite | 63.10 |
| Bentonite clay | 8.65 |
| Partially acetylated corn starch | 6.32 |
| Asbestos fibers 7 W grade | 18.90 |
| Glass fibers (1 inch spun roving) | 0.75 |
| Phenolic resin | 1.89 |
| Water soluble silicone (Sodium methyl siliconate) | 0.39 |

The asbestos fibers and glass fibers are weighed and blended with the expanded pearlite. A binder solution is prepared by dispersing the specified amount of bentonite, starch, phenolic resin and sodium siliconate in water. The water used will be from 1.2 to 1.4 times the weight of the dry materials, and this binder solution is sprayed over the dry materials. The moistened mixture is then further agitated and blended to complete the distribution of binder solution to make a slightly damp granular mass.

The slightly damp mix is placed in a mold cavity of the type described in example 1, and is subjected to a light molding pressure sufficient to compact the loose material into a monolithic molded mass having the exact configuration of the mold cavity. The molded piece is then removed from the mold and subjected to drying in an oven at a temperature of approximately 250° F. In this material, the starch and phenolic resin organic binders provide strength at low temperatures, such that the molded product can be handled and installed. At elevated temperatures the organic binders burn off and the clay is transformed into a permanent binder.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:

1. In the insulation material of the type comprising a pair of identically shaped blocks having abutment surfaces on opposite sides of aligned cavities, and C-shaped spring means on outside surfaces of the blocks with the open portion of the C-shaped spring means straddling the abutting surfaces on one side of the aligned cavities, the improvement wherein the abutment surface on one of said opposite sides is stepped to provide a radially inner portion and a radially outer portion which are not coplanar and are separated by a shoulder, the radially outer portion of said one of said opposite sides forming a projection and said radially inner portion of said one of said opposite sides forming a recess, the abutment surface on the other of said opposite sides also being stepped to provide a radially inner portion and a radially outer portion which are not coplanar and are separated by a shoulder, the radially inner portion of said other of said opposite sides forming a projection and said radially outer portion of said other of said opposite sides forming a recess, said shoulders of the abutment surfaces of each block facing in the same direction, said projections being wider than said recesses in their uncompressed condition, and said projections of one block wedging into said recesses of the other block, and whereby said C-shaped spring means biases said blocks laterally to force adjacent shoulders into firm locking engagement.

2. The insulation material of claim 1 wherein said stepped abutment surfaces are undercut to provide a Z-shaped surface.

3. The insulation material of claim 1 having annular stepped end surfaces which are undercut to provide a Z-shaped configuration, said undercutting being designed to limit endwise separation of endwise engaging pairs of blocks, and whereby thermal expansion of an object on which endwise engaging pairs of blocks rest is accommodated by limited relative movement between adjacent pairs of blocks without complete separation between any two adjacent pairs of blocks.

* * * * *